United States Patent [19]

Tucci

[11] 4,292,732

[45] Oct. 6, 1981

[54] APPLICATOR FOR METAL STRAIN RELIEF CLAMP

[75] Inventor: John J. Tucci, Winston-Salem, N.C.

[73] Assignee: AMP Incorporated, Harrisburg, Pa.

[21] Appl. No.: 46,414

[22] Filed: Jun. 7, 1979

[51] Int. Cl.³ ........................ B23P 19/00; H01R 43/04

[52] U.S. Cl. ........................ 29/749; 29/566.1; 29/751; 100/288; 254/95; 408/135

[58] Field of Search ................ 29/566.1, 566.3, 566.4, 29/564.2, 749, 750, 751, 752, 753, 758, 748; 408/135; 254/95; 267/59, 62; 100/288; 101/3 SP

[56] References Cited

U.S. PATENT DOCUMENTS

| | | | |
|---|---|---|---|
| 1,002,651 | 9/1911 | Daubenspeck | 100/288 X |
| 1,047,936 | 12/1912 | Hare | 408/135 X |
| 2,654,309 | 10/1953 | Jonsson | 100/288 X |
| 2,768,425 | 10/1956 | Andren | 29/748 X |
| 3,911,712 | 10/1975 | Wustinger et al. | 29/751 X |
| 4,127,315 | 11/1978 | McKee | 339/103 B |
| 4,148,138 | 4/1979 | Becker et al. | 29/749 |
| 4,159,565 | 7/1979 | Schwalm | 29/759 |
| 4,193,187 | 3/1980 | Haller et al. | 29/749 |
| 4,216,668 | 8/1980 | Walton | 29/753 X |

*Primary Examiner*—Z. R. Bilinsky

*Attorney, Agent, or Firm*—Gerald K. Kita

[57] ABSTRACT

The present invention relates to a tool having a hand operated lever operative with one lever stroke to pivot the tool into position on a work station, to insert a multiple conductor cable in between a pair of clamping and gripping jaws of a metal clamp of an electrical connector to which the conductors are to be connected, and to close the jaws onto the cable. Release of the lever retracts the cable insertion mechanism and pivots the tool away from the work station.

5 Claims, 12 Drawing Figures

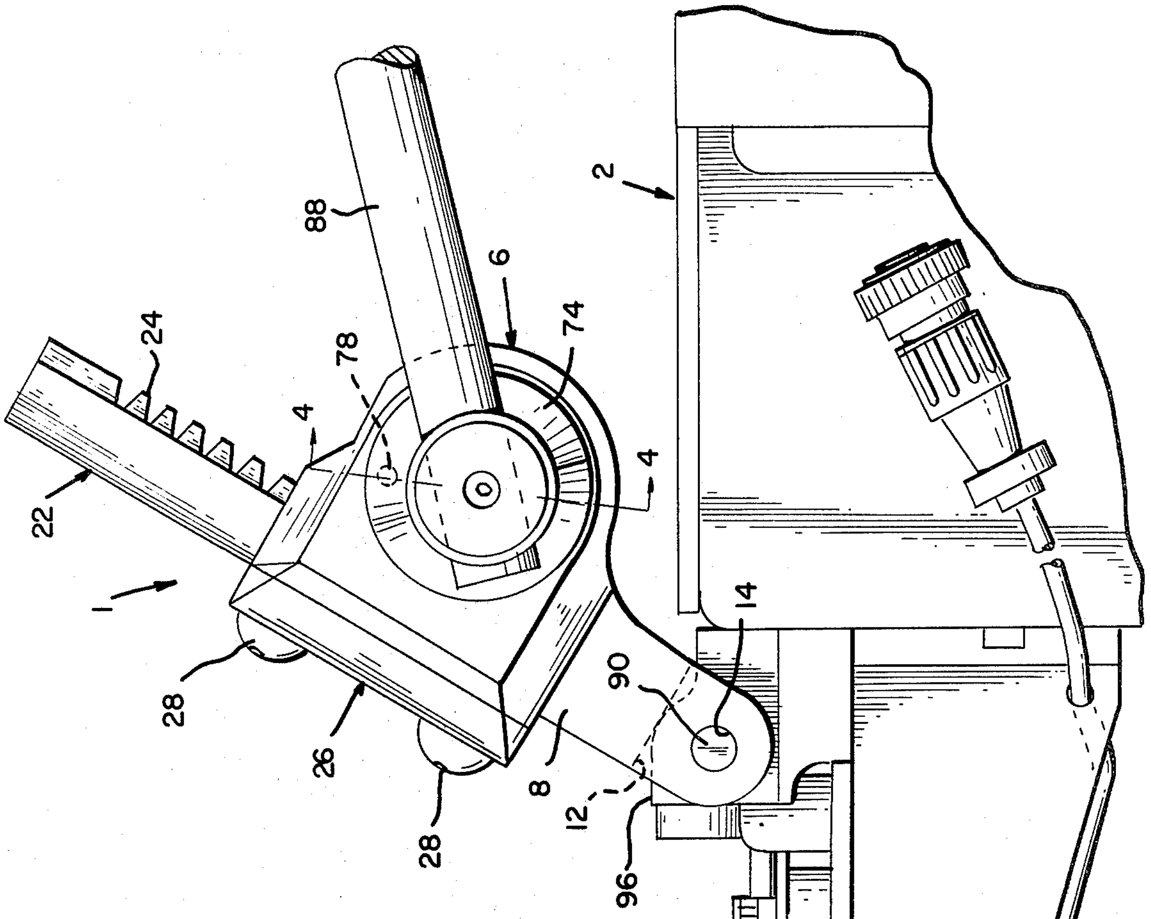
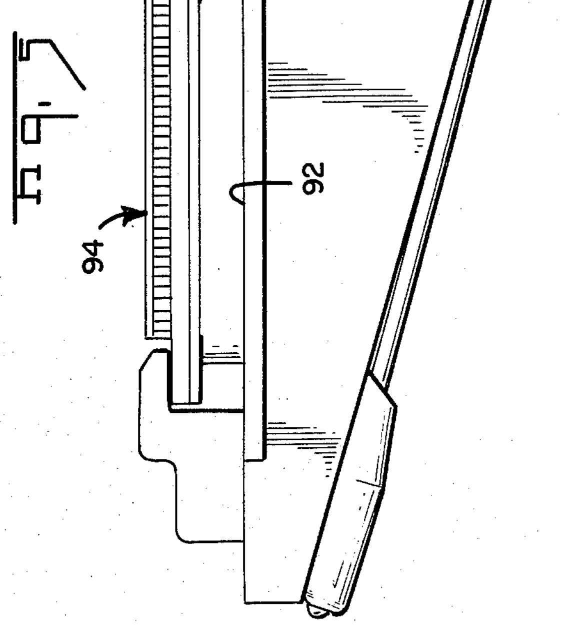
Fig. 5
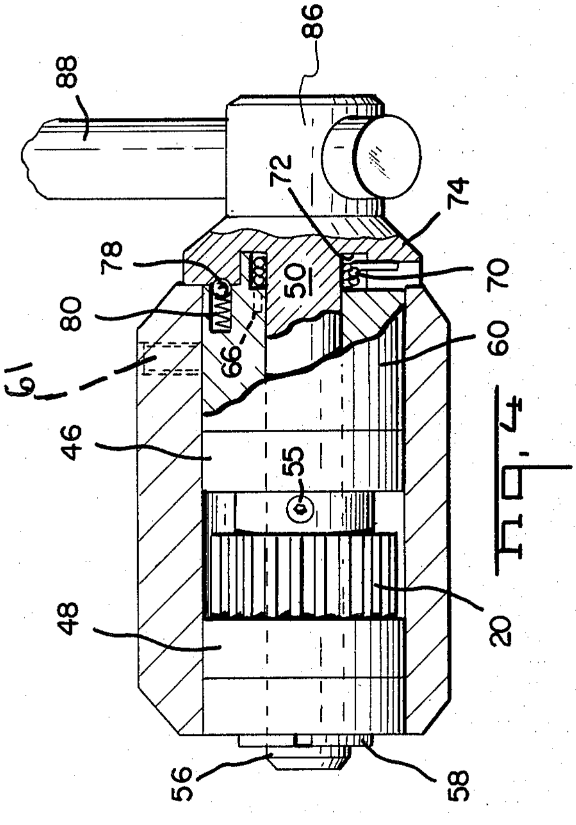
Fig. 4

94
98
100
102
104
106
108
110
112
114
116

APPLICATOR FOR METAL STRAIN RELIEF CLAMP

FIELD OF THE INVENTION

The invention relates to automated assembly of multiple conductor cable and an electrical connector having multiple, conducting electrical contacts to which the cable conductors are electrically connected. The invention further relates to a tool for quickly securing the cable to a metal, strain relief clamp which anchors the cable to the connector to prevent removal the conductors from the contacts.

BACKGROUND OF THE INVENTION

An electrical connector as described in U.S. Pat. No. 3,760,335, includes two parallel rows of electrical contacts. The contacts of a plug version of the connector resiliently engage those of a receptacle version, when the two versions are interfitted. The contacts of each version have wire-receiving portions each in the form of a resilient plate having a slot. A conductor of the cable is trimmed and inserted into the slot, with the sides of the slot providing jaws which slice through the insulation of the conductor and resiliently engage the wire of the conductor. Suitable apparatus have been developed for trimming and inserting the conductors into the contacts. See, for example, U.S. Pat. Nos. 3,803,695; 3,864,802; and 3,995,358. Each apparatus requires an operator to grasp a pair of wires and insert them into the apparatus. Subsequently, the apparatus is actuated, either manually, or automatically upon sensing the presence of the inserted wires, to trim the wires and transfer the trimmed wires into the contacts of the connector. One type of apparatus requires all conductor pairs in the apparatus before mass insertion of the conductors simultaneously in the contacts. Another type is automatically triggered by sensing each pair of conductors to trim and insert the pair into a pair of corresponding contacts. While an operator is in the process of selecting and locating the next pair of conductors, the apparatus has automatically moved, relative to the connector, into registration with additional contacts with which the next pair of conductors is to be connected.

The object of each newly developed apparatus is to decrease the time required to connect all the conductors to the connector contacts. One time consuming task has been the requirement for anchoring the cable to the connector, to prevent tension on the cable from dislodging one or more conductors from their connections with the contacts. A self-latching strap or tie, provides the anchor in one early version. See U.S. Pat. No. 4,035,051. Another version utilizes a U-shaped clamp which receives a plug having ratchet teeth which interlock with teeth on the U-shaped clamp as the plug is ratcheted into the open end of the clamp to engage the cable. See U.S. Pat. No. 4,130,330. Still another version requires a single piece metal clamp preassembled onto the connector. The clamp includes a pair of spaced apart jaws, which receive the cable therebetween, and which are bent toward each other to grip the cable. The present invention provides a tool having a mechanism for holding the cable between the clamp jaws and for closing the jaws on the cable, so that the cable is anchored to the connector during and after connection of the conductors to the connector contacts.

SUMMARY OF THE INVENTION

The tool according to the present invention may be used in conjunction with conductor trimming and insertion apparatus, using the same work station on which a connector is located during wire trimming and insertion operations. The tool of the present invention is pivoted away from the work station when not in use. A hand pivoted lever is operative by a single lever stroke to pivot the tool into position on the work station, to insert the cable in between the clamp jaws, and to close the jaws in gripped relationship on the cable. Release of the lever retracts the mechanism used for cable insertion and jaw closing, and pivots the tool away from the work station.

Accordingly, an object of the present invention is to provide a tool operative with one lever stroke to pivot the tool to an operative position at a work station and to insert a cable between jaws of a clamp, as well as to close the jaws on the cable.

Another object is to provide a tool which closes a strain relief clamp on a cable, and which may be used in conjunction with a work station of apparatus for trimming and inserting wire pairs into the contacts of an electrical connector to which the cable clamp is preassembled.

Another object of the present invention is to provide a tool operative with one lever stroke, first, to pivot the tool position on a work station of apparatus for trimming and inserting wire pairs into the contacts of an electrical connector to which a metal strain relief clamp is preassembled, then to insert a multiple conductor cable into the clamp, and then to close the jaws of the clamp on the cable to anchor the same to the connector, and, upon release of the lever, to retract the tool from the cable and the clamp and pivot the tool away from the work station.

Other objects and advantages of the present invention will become apparent from the detailed description taken in conjunction with the following described drawings.

DRAWINGS

FIG. 1 of the drawings is a perspective of a preferred embodiment of the tool according to the present invention, mounted on a work station of apparatus for trimming and inserting conductors of a multiple conductor cable.

FIG. 3 is a fragmentary enlarged perspective with parts exploded illustrating a hand operated lever and shaft for driving the pinion.

FIG. 4 is an enlarged elevation with the assembled parts shown in FIG. 3 illustrated in section or broken away.

FIG. 5 is a fragmentary enlarged elevation of the tool mounted on the work station of the apparatus shown in FIG. 1, and illustrating structure allowing pivoting of the tool either to an operative position or away from the work station.

Figures 10, 11, 12:
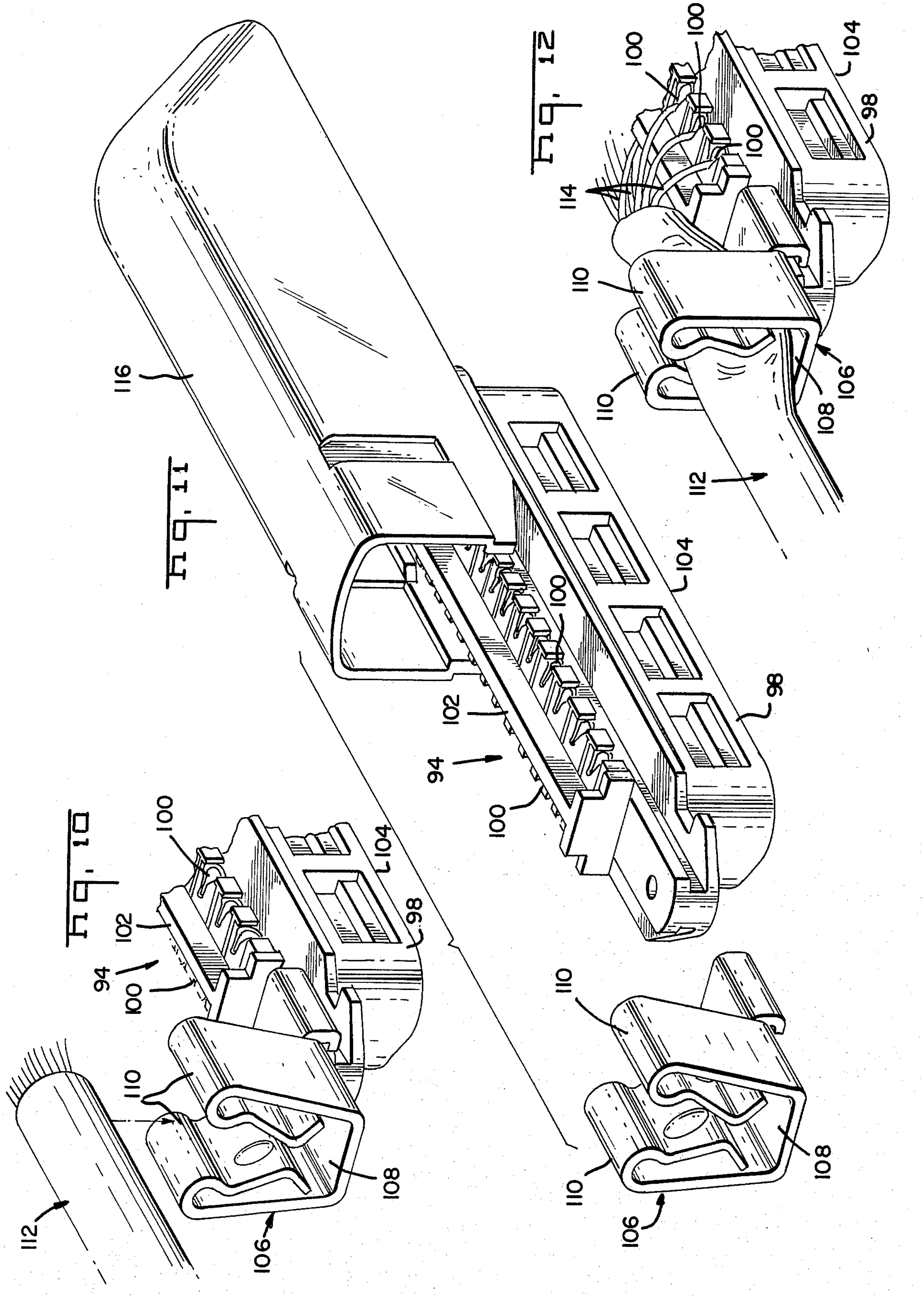

FIGS. 10, 11, and 12 are enlarged perspectives of an electrical connector and metal strain relief clamp together with a multiple conductor cable secured to the clamp and with the conductors of the cable trimmed and inserted into contacts of the connector.

DETAILED DESCRIPTION

Figure 1:
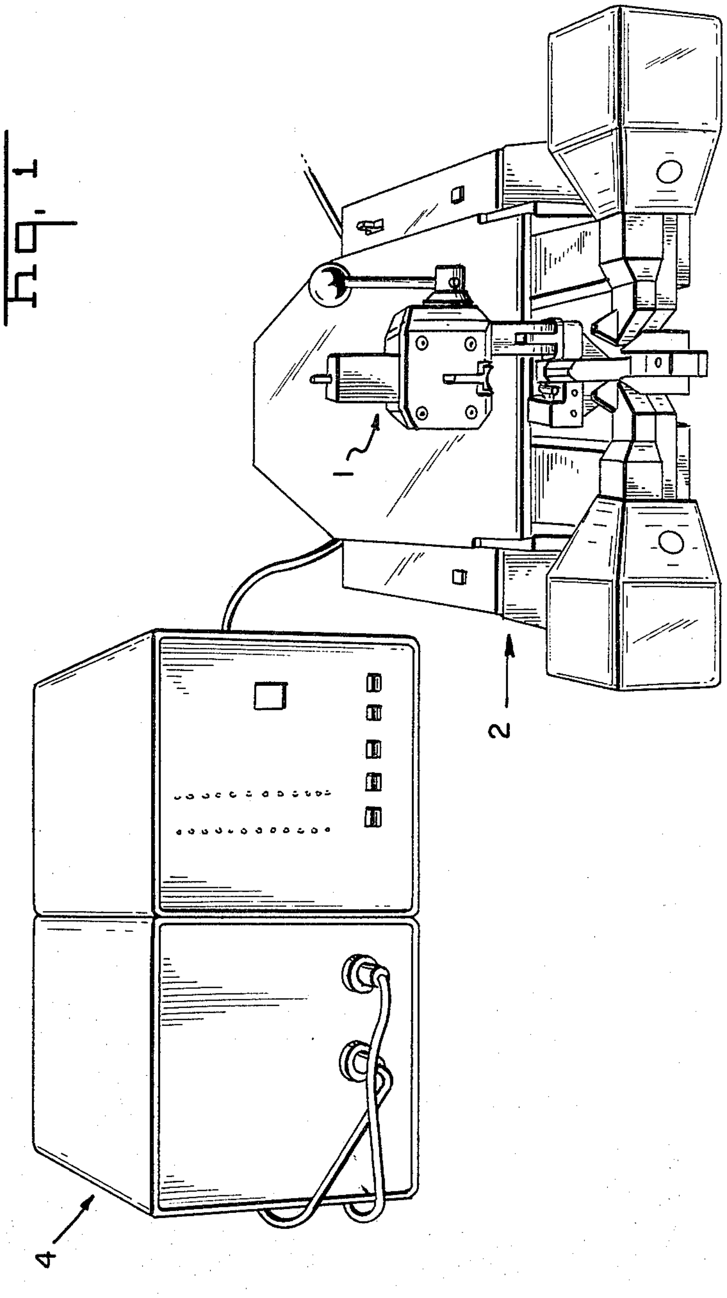

With more particular reference to the drawings, there is shown in FIG. 1 a tool 1, mounted on a machine apparatus 2 for trimming and inserting pairs of conductors into corresponding contacts of an electrical connector. Associated with the machine is an instrument console 4 which electrically programs the machine for certain functions, such as, positioning the machine elements in a start position or indexing the machine elements to desired positions with respect to an electrical connector mounted on a work station of the machine.

Figure 2:
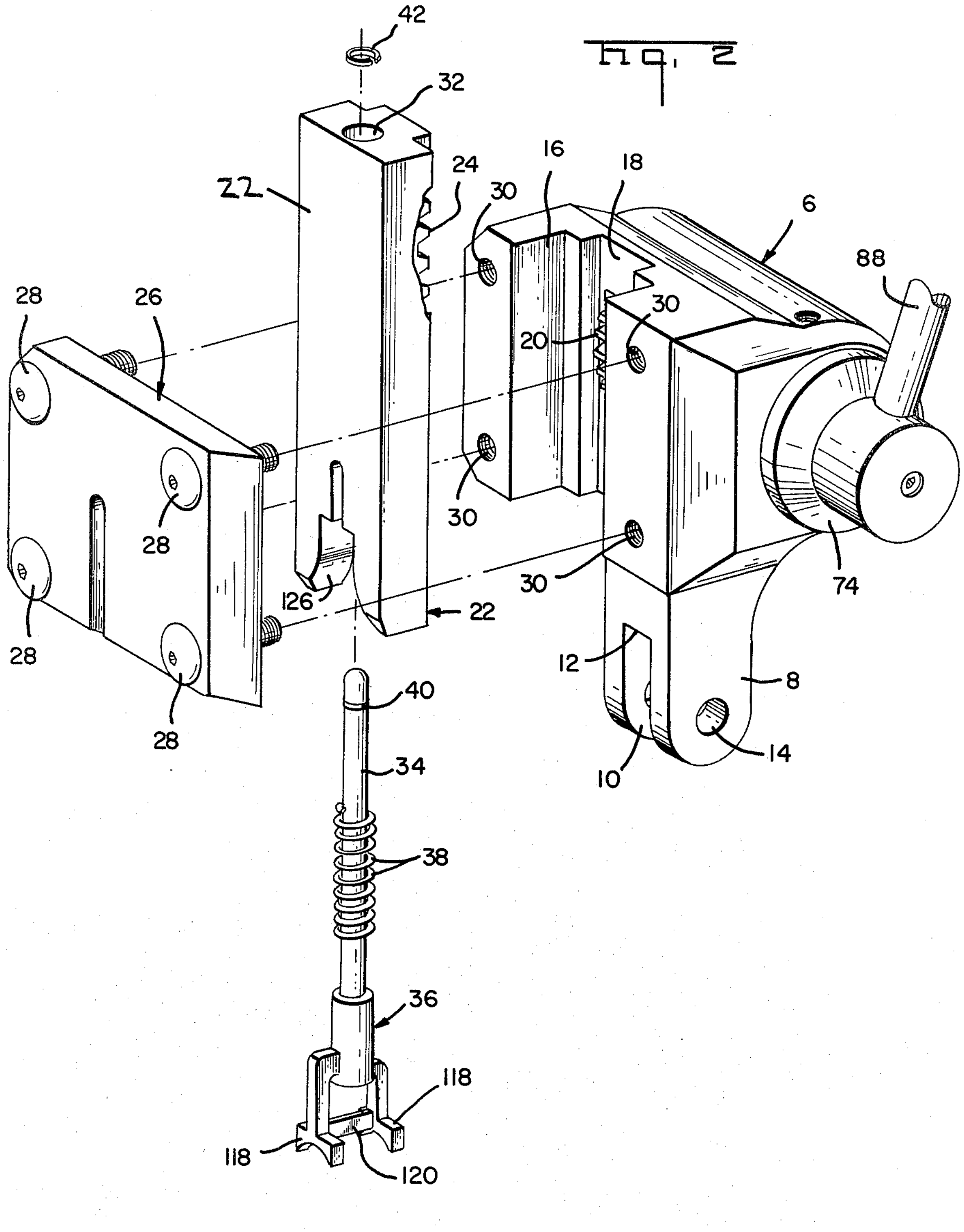
FIG. 2 is a fragmentary enlarged perspective with parts exploded of a rack and pinion drive and a toolhead of the tool.

FIG. 2 illustrates the tool 1 as comprising a housing or casing 6 having a clevis 8 provided with a central slot 10, the end of which defines an inverted shoulder 12. A bore 14 extends through the bifurcated clevis.

The housing includes a stepped, vertical channel 16 having a central stepped section 18 into which protrudes a pinion 20. A generally rectangular ram 22 slidably mounts in the channel 16 and is provided with an integral vertical rack 24 having teeth which mesh with the teeth of the pinion 20. The rack is vertically slidable along the stepped channel section 18. A cover plate 26 overlies the ram and is secured to the housing by threaded fasteners 28 threadably secured in tapped bores 30 in the housing. The ram is provided with a vertical bore 32 slidably mounting a rod portion 34 of a plunger 36. A coil spring 38 encircles the rod portion and is compressed against the bottom of a stepped shoulder 39 is the bore 32, upon vertical movement of the plunger relative to the ram. The upper end of the rod portion is provided with an encircling groove 40 into which is received a snap ring 42 of a diameter which prevents passage of the ring vertically into the bore 34.

FIGS. 2 and 3 illustrate a lever actuated drive shaft for the pinion. The housing 6 is provided with an enlarged bore 44 mounting the outer races of a spaced apart pair of bearings 46 and 48. The inner races of the bearings mount a rotatable shaft 50. The pinion 20 is mounted over the shaft and held in place by a key 52 along the keyway 54 in the shaft. The key is retained by tightening a set screw 55 threaded into the hub of the pinion. One end of the shaft is provided with an encircling groove 56 into which is mounted a snap ring 58 which will not pass through the inner race of the bearing 48.

Further details of the lever actuated drive shaft will be described with reference to FIGS. 3 and 4. Adjacent the bearing 46 is provided a block 60 rotatably mounted in the bore 44. A set screw 61 threaded along a bore in the housing 6 is tightened to engage and lock the block against rotation and adjusts the initial orientation of the lever 88. A concentric bore 62 in the block receives the shaft 50 therethrough. A coil spring 64 encircles the shaft 50 with one end 66 of the spring fixedly secured in a recess 68 in the end of the block. The other end 70 of the spring is received in a recess 72 of an encircling flange 74 machined integral with the shaft 50. The coils of the spring 64 are encircled by a partially cylindrical bezel 76 that registers inside a counterbore recess of the flange 74. A ball detent includes a ball 78 and loading spring 80 within a recess 82 of the block 60. The ball registers within a detent 84 in the end of the flange 74. An enlarged end hub 86 integral with the flange includes a lever 88 transverse to the axis of the shaft 50.

Pivoting the lever will normally rotate the shaft and drive the rack and pinion. However, initial pivoting of the lever must overcome the ball detent, and load the coil spring 64. This feature is advantageously utilized to pivot the tool into operative position on a work station. FIG. 5 shows the tool 1 mounted by a pin 90 through its clevis 8 at an anvil type work station 92 of the apparatus 2. An elongated electrical connector 94 of a type previously mentioned is mounted on the anvil. As shown in FIG. 5, the tool initially is pivoted away from the anvil 92, out of the way of the connector 94. Initial pivoting of the lever will pivot the tool counterclockwise to an upright position, until the shoulder 12 registers against a corresponding shoulder 96 on the work station. The tool is then in an operative position, with the engaged shoulders providing resistance to further pivoting of the tool. Sufficient resistance is provided that further pivoting the lever will overcome the ball detent and load the coil spring 80 permitting the shaft to rotate and drive the rack and pinion. When the lever is released, the stored energy in the coil spring will cause reverse rotation of the shaft. The released lever will shift the center of gravity of the tool, so that the tool will pivot away from the anvil, returning to its position shown in FIG. 5. The stored spring energy also tends to "throw" the lever when released, further assisting in pivoting the tool away from the work station.

The connector 94 is more particularly illustrated in FIGS. 10, 11, and 12. The connector includes a plastic body 98 having electrical contacts with wire-receiving portions 100 each in the form of a resilient metal plate having a slot. The sides of the slot provide jaws which slice through insulation of the conductor and resiliently engage the wire of the conductor. The wire receiving portions are arranged in two parallel rows, exposed along a side 102 of the connector. An opposite side 104 of the connector is mounted against the anvil.

Adjacent the rows of contacts on the connector side 102 is located a metal, strain relief clamp 106. The clamp includes a base portion 108 secured to the connector and a pair of spaced apart jaws or clamp arms 110. A multiple conductor electrical cable 112 is first inserted in between the jaws, as shown in FIG. 12. The jaws are then closed on the cable. Thereby, the cable is secured to the connector in preparation for the apparatus 2 to trim pairs of the cable conductors 114 and insert them into the wire receiving slots of the connector contacts. Subsequently, a plastic cover 116 is secured over the connector end 102, the contact wire receiving portions 100, a portion of the cable and the cable clamp 106.

The tool 1 is used for inserting the cable in the clamp and for closing the clamp on the cable with a single stroke of the lever. The tool also must pivot away from the anvil to allow the apparatus 2 access to the connector for inserting trimmed conductors into the connector contacts.

Figure 7:
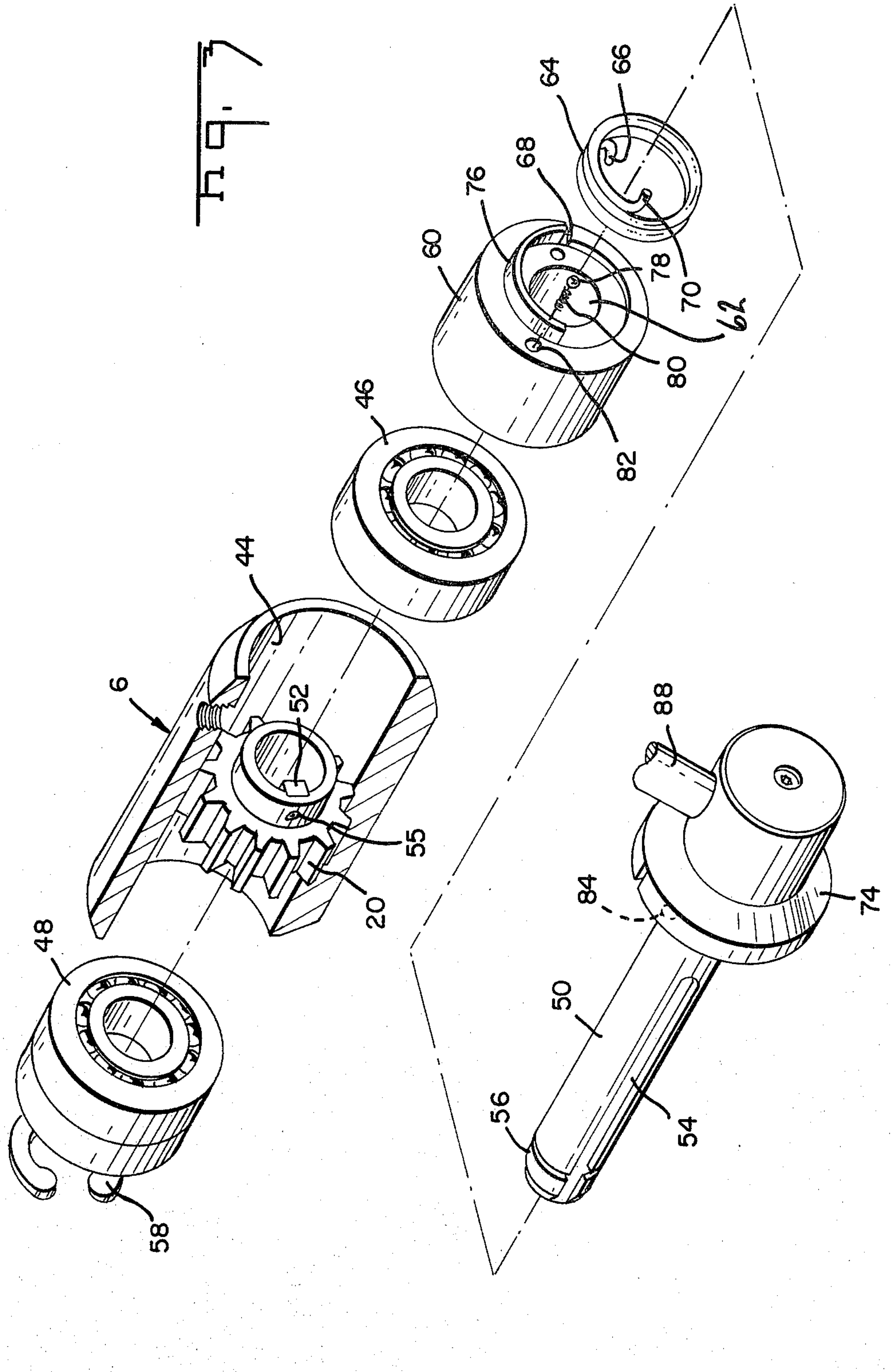
FIG. 7 is a fragmentary enlarged elevation of the cable closing portion of the toolhead, illustrating closure of the clamp jaws onto the cable inserted by the plunger.
Figure 6:
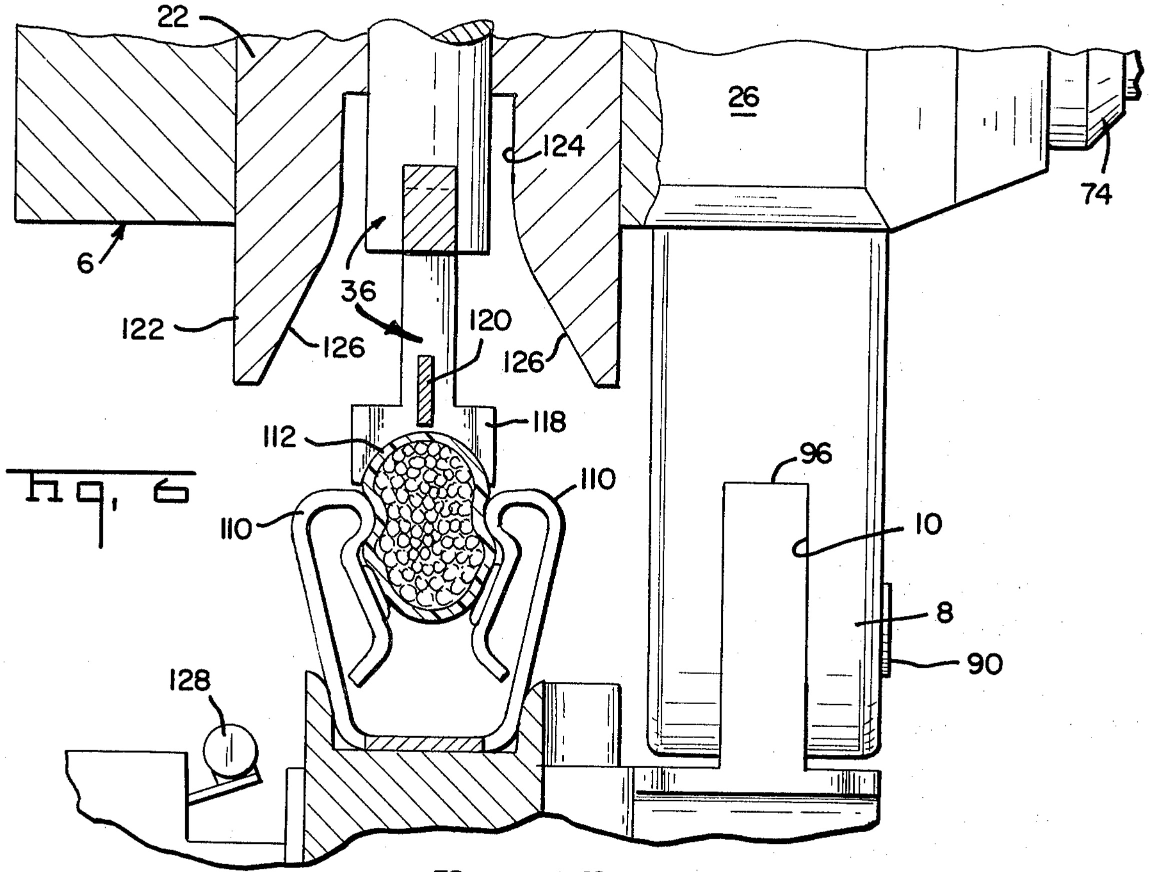
FIG. 6 is a fragmentary enlarged elevation illustrating the tool head portion of the tool, and specifically, a plunger portion which inserts a multiple conductor cable into the jaws of a metal strain relief clamp.
Figure 7:
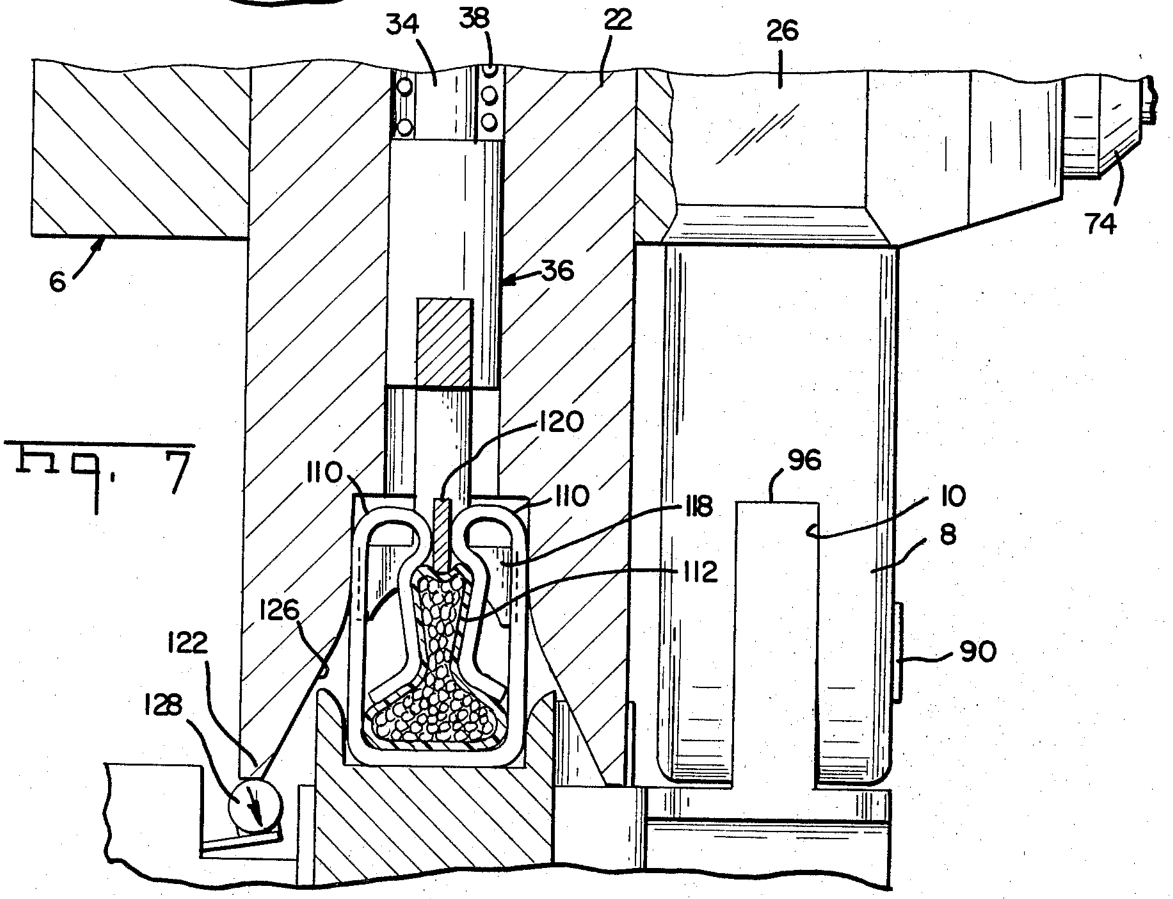
Figure 8:
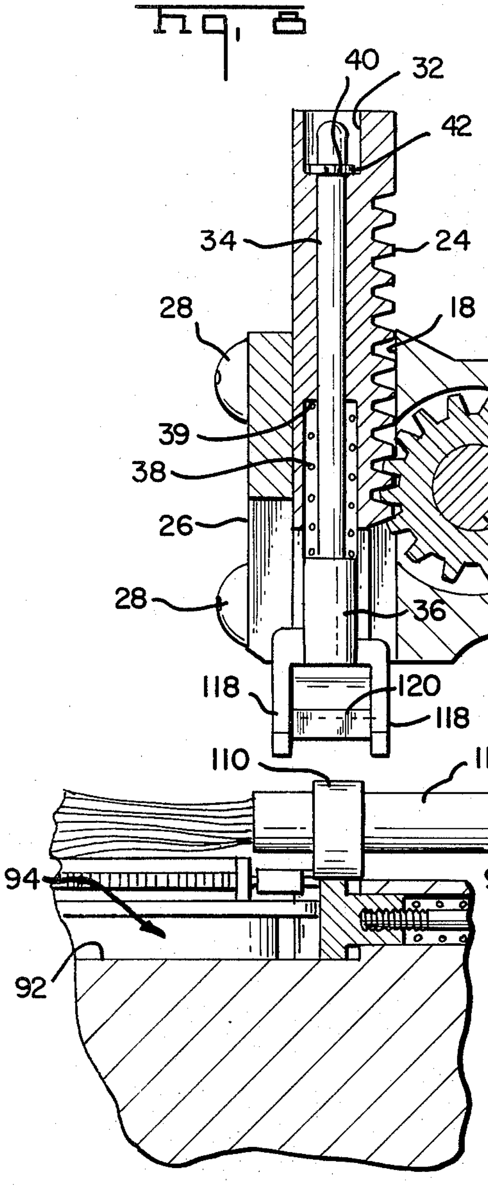
FIG. 8 is a fragmentary side elevation in section of the toolhead as shown in FIG. 6.
Figure 9:
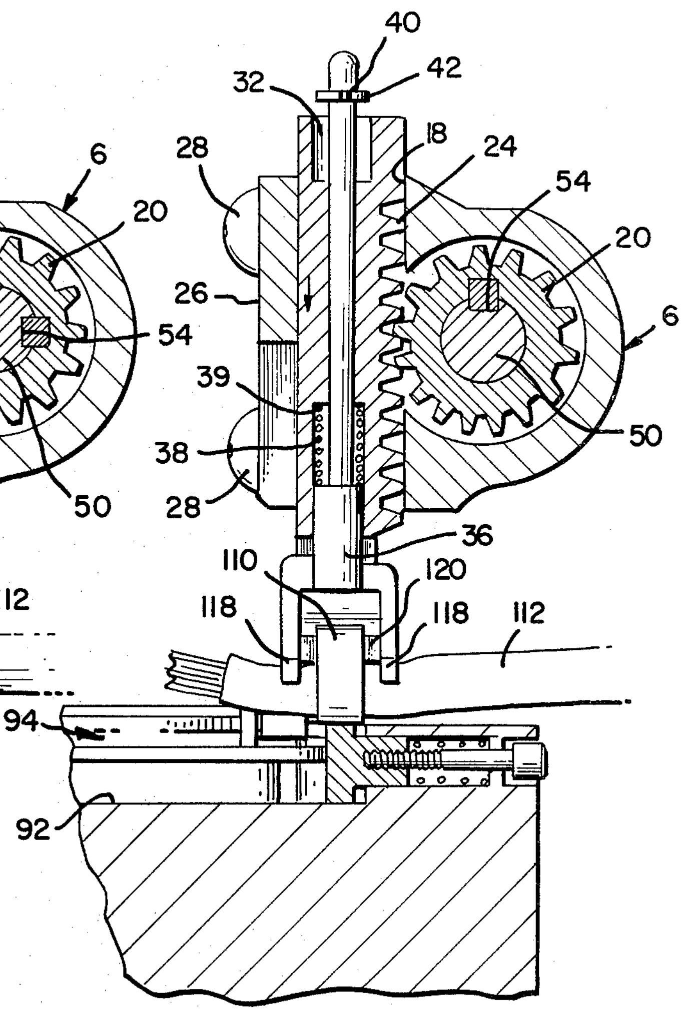
FIG. 9 is a fragmentary side elevation in section of the toolhead as shown in FIG. 7.

In operation of the tool, reference is made to FIGS. 6 through 8. An end of the plunger 36 protrudes from an end of the ram and has spaced aligned yokes 118, joined by a blunt edge blade 120. As the rock 23 is driven vertically downward by rotation of the pinion 20, the yokes engage a short length of the cable 112 which has been located over the clamp jaws 110 by an operator. The yokes align the cable length while the blade engages the length axially, and inserts the cable length in between the clamp jaws. Continued pivoting of the lever will advance the ram 22 toward the clamp jaws, forcing the plunger to retract inwardly of the ram, compressing the coil spring 38. The end 122 of the ram has an inverted opening 124 provided with flared side walls 126. The sidewalls 126 engage the clamp jaws 110, forcing them into progressively narrower widths of the opening 124, until the jaws are forcibly bent toward each other, compressibly encircling the cable. FIG. 7 shows the ram end 122 depressing and actuating a lever type, electrical switch 128 which turns on a light (not shown) to indicate that sufficient displacement of the ram has occurred to close the clamp jaws.

Release of the lever will allow upward movement of the ram. Initially, the plunger blade 120 may be clamped between the jaws 110. The stored energy in the compressed coil spring 38 will force the ram upward while the plunger remains. The ram will release the jaws, allowing them to spring apart slightly, due to residual spring energy stored upon bending the jaws toward each other. The blade will then be freed, permitting vertical upward retraction of the plunger from the jaws. The tool will then be free to pivot away from the anvil in the manner previously described.

Although a preferred embodiment of the present invention is disclosed in detail, other modifications and embodiments which would be obvious to one having ordinary skill in the art are intended to be covered by the spirit and scope of the appended claims.

I claim:

1. In a tool for closing a cable clamp portion of an electrical connector onto a multiple wire electrical cable, the tool having a work station supporting said connector and said clamp portion, a housing mounting: a ram carrying a toolhead for engaging and closing said clamp portion, a drive mechanism for reciprocating said toolhead toward and away from said clamp portion, a rotatable shaft mounting said pinion and mounting a lever which is manually pivotable for reciprocating said shaft in a first direction and a return mechanism for rotating said shaft in a second direction upon manual release of said lever, the improvement comprising:

a cable engaging first means projecting from said toolhead for engaging and thrusting a cable internally of said clamp portion prior to closure thereof by said toolhead, said housing being pivotally mounted to said work station, second means for limiting pivotal movement of said housing in said first direction and for positioning said toolhead for reciprocation together with said rack toward said clamp portion, and said housing being pivotable in a second direction by a shift in gravity resulting from manual release of said lever and pivoting of said lever by said return mechanism.

2. The improvement as recited in claim 1, wherein said second means comprises a shoulder member fixedly mounted on said work station and engaged by said housing upon pivoting thereof in said first direction.

3. The improvement as recited in claim 1, wherein, said first means in mounted for retraction in respect to said toolhead.

4. The improvement as recited in claim 1, wherein, said first means comprises a plunger, a coil spring encircling said plunger and resiliently compressible upon retraction of said plunger in respect to said toolhead, a pair of yokes depending from said plunger and a blade joining said yokes.

5. The improvement as recited in claim 1, and further including: third means in said housing providing resistance to initial manual pivoting of said lever during pivoting of said housing in said first direction.

* * * * *